United States Patent [19]
Umemura et al.

[11] 3,872,148
[45] Mar. 18, 1975

[54] CATALYTIC AMMOXIDATION OF PROPYLENE OR ISOBUTYLENE

[75] Inventors: Sumio Umemura; Kyoji Ohdan; Yasuo Bando, all of Ube; Mikio Hidaka, Shimonoseki; Kazuo Fukuda, Ube, all of Japan

[73] Assignee: UBE Industries, Ltd., Ube, Yamaguchi-ken, Japan

[22] Filed: July 13, 1973

[21] Appl. No.: 378,978

[30] Foreign Application Priority Data
Aug. 4, 1972   Japan.............................. 47-77616

[52] U.S. Cl.............. 260/465.3, 252/456, 252/457, 252/468
[51] Int. Cl........................................ C07c 121/02
[58] Field of Search................................ 260/465.3

[56] References Cited
UNITED STATES PATENTS
3,280,167   10/1966   Schwarzer et al. ............. 260/465.3
3,641,100   2/1972   Yamada et al.................. 260/465.3

FOREIGN PATENTS OR APPLICATIONS
40-2532   2/1965   Japan............................. 260/465.3
1,024,402   3/1966   United Kingdom............. 260/465.3

Primary Examiner—Joseph P. Brust

[57] ABSTRACT

An improved catalyst for the catalytic ammoxidation of propylene or isobutylene to acrylonitrile or methacrylonitrile, respectively, is provided. The catalyst has a composition corresponding to the empirical formula, $$BiMo_aW_bII_cX_dO_e$$

where II is at least one metal of Group II of the Periodic Table; X is selected from Ti, Zr, Nb, Ta, V, Cr, Mn, Fe, Co and Ni; and $a = 0.3 - 10$, $b = 0.05 - 3.0$, $c = 0.1 - 6.0$ and $d = 0 - 5.0$. The catalyst exhibits excellent conversion of the olefin and selectivity to the nitrile.

5 Claims, No Drawings

CATALYTIC AMMOXIDATION OF PROPYLENE OR ISOBUTYLENE

This invention relates to a novel catalyst for ammoxidation of propylene or isobutylene, and to a process for the manufacture of acrylonitrile or methacrylonitrile wherein propylene or isobutylene, ammonia and oxygen are contacted in a vapor phase with the novel catalyst.

Various catalysts have been heretofore proposed for use in a vapor phase catalytic ammoxidation of olefins to produce the corresponding unsaturated nitriles with a view to enhancing selectivity for a desired unsaturated nitrile without reducing conversion of the olefin feed. The known ammoxidation catalysts include, in general, a combination of oxides of two or more metals, for example, a Mo—Bi—(P)—oxide system described in Japanese Pat. No. 5870/1961, a Sn—Sb system described in Japanese Pat. No. 13966/1962, a U—Sb system described in Japanese Pat. No. 24367/1965 and a Fe—Sb system described in Japanese Pat. No. 19111/1963.

Generally, however, it has been difficult to obtain both high selectivity to desired unsaturated nitrile and high conversion of olefin, i.e., there has been a need for controlling the conversion in order to obtain a high selectivity. With these known catalysts, yield of unsaturated nitrile is at most approximately 70%. In general, since a long contact time and a high temperature, e.g., approximately 450°C or more are required, the yield of unsaturated nitrile per weight of catalyst is inevitably reduced, and the life of the catalyst is shortened.

It is a main object of this invention to provide improved ammoxidation catalyst and process which enable the manufacture of acrylonitrile or methacrylonitrile at a relatively low reaction temperature for a relatively short contact time and with both high conversion and high selectivity.

Other objects and advantages will be apparent from the following description including the working examples.

In accordance with this invention, there is provided a catalyst for the ammoxidation of propylene or isobutylene to acrylonitrile or methacrylonitrile, respectively, characterized by having a composition corresponding to the empirical formula, $$BiMo_aW_bII_cX_dO_e$$

wherein II is at least one metal selected from Groups II of the Periodic Table; X is at least one metal selected from the group consisting of titanium, zirconium, niobium, tantalum, vanadium, chromium, manganese, iron, cobalt and nickel; and each of $a$, $b$, $c$ and $d$ is a number expressing an atomic ratio of the respective metal to bismuth and falling within the following ranges, $a = 0.3$ to $10$, $b = 0.05$ to $3.0$, $c = 0.1$ to $6.0$ and $d = 0$ to $5.0$, and $e$ is a number which satisfies the average valency of the metals.

Further, there is provided a process for the manufacture of acrylonitrile or methacrylonitrile from propylene or isobutylene which comprises contacting, in the vapor phase, at an elevated temperature a mixture of propylene or isobutylene, ammonia and oxygen with a catalyst having the particular composition as defined above.

Compared with the use of a conventional ammoxidation catalyst, the above-defined catalyst, at a lower reaction temperature such as approximately 400°C, for a shorter contact time, produces an unexpectedly good yield of 80% or more, considering the above process conditions.

The catalyst of this invention is characterized by having the composition corresponding to the empirical formula, $$BiMo_aW_bII_cX_dO_e.$$

In this empirical formula, "II" signifies at least one metal selected from Group II of the Periodic Table. The metal II preferably includes, calcium, barium, zinc, cadmium, strontium, magnesium and mercury. Of these, calcium, barium and zinc are most preferable. "X" signifies at least one metal selected from, titanium, zirconium, niobium, tantalum, vanadium, chromium, manganese, iron, cobalt and nickel.

Atomic ratios of the respective metals to bismuth, which are indicated by $a$, $b$, $c$ and $d$ in the empirical formula are as follows, $a = 0.3 - 10$, preferably $0.5 - 3.0$
$b = 0.05 - 3.0$, preferably $0.1 - 1.5$
$c - 0.1 - 6.0$, preferably $0.2 - 5.0$
$d = 0 - 5.0$, preferably $0.1 - 4.0$ $e$ is a number taken to satisfy the average valency of the metals employed, and in general falls within the range from 3.2 to 61.5.

In the case where the catalyst contains chromium in an amount such that an atomic ratio of chromium to bismuth is within the range of 0.1 to 3.0, the catalyst exhibits excellent dimensional stability and mechanical properties, as compared with a catalyst containing no chrome, and especially a conventional catalyst.

These metal ingredients may be present in the catalyst composition either as a mixture of the metal oxides or in a bonded state.

Typical procedures for the manufacture of some of the catalysts will be illustrated.

Bi—Mo—W—II—O catalyst

A stated amount of ammonium paratungstate is dissolved in hot water. A stated amount of calcium nitrate is dissolved in the aqueous solution. Successively, a solution of a stated amount of bismuth nitrate in nitric acid and a solution of a stated amount of ammonium molybdate in aqueous ammonia are added by drops into the above solution at the same time, while the solution is stirred, thereby forming a precipitate. After leaving overnight, the precipitate is washed by repeated decantation, filtered, dried and finally, calcined. The calcined product is pulverized and shaped into pellets or particles of desired shape and size. Similarly, catalysts which contain barium, zinc or other metals of Group II of the Periodic Table, substituted for the calcium, may also be prepared.

Bi—Mo—W—II—X—O catalyst (1)

A stated amount of ammonium paratungstate is dissolved in hot water, followed by the addition of niobium pentaoxide. In this solution, a stated amount of calcium nitrate is dissolved, and successively, a solution of a stated amount of bismuth nitrate in nitric acid and a solution of a stated amount of ammonium molybdate in aqueous ammonia are added by drops thereinto at the same time, while the solution is stirred, thereby forming a precipitate. The precipitate is treated in a manner similar to that described in the previous example. Other catalysts, which contain barium, zinc or other Group II metals substituted for the calcium, and other metals classified as X, substituted for the niobium, may also be prepared by a similar procedure.

Bi—Mo—W—II—X—O catalyst (2)

A solution of ammonium molybdate in aqueous ammonia is treated with a solution of calcium nitrate in nitric acid, the amounts of Mo and Ca being equimolar, to produce a coprecipitate. The coprecipitate is washed, filtered, dried and then, calcined. The product is calcium molybdate expressed by the formula $CaMoO_4$.

A solution of iron nitrate in nitric acid is treated with a solution of bismuth nitrate in nitric acid, the amounts of Fe and Bi being equimolar. The mixed solution is heated to dryness until generation of nitrogen oxide ceases. The obtained solid is calcined to form bismuth ferrate, expressed by the formula $BiFeO_3$.

The calcium molybdate ($CaMoO_4$) and the bismuth ferrate ($BiFeO_3$) are kneaded with water, dried, calcined and then, shaped into pellets or particulate forms.

Similarly, other catalysts may be prepared by mixing and kneading, for example, calcium molybdate ($CaMoO_4$) with bismuth vanadate ($BiVO_4$), bismuth titanate ($Bi_2Ti_2O_7$), bismuth tantalate ($BiTaO_4$), bismuth tungstate ($Bi_2O_3.WO_3$, $Bi_2O_3.3WO_3$, $3Bi_2O_3.4WO_3$), bismuth niobate ($Bi_2NbO_5$, $BiNbO_4$) and bismuth zirconate [$Bi_2(ZrO_3)_3$].

The procedures for the preparation of the catalyst are not critical. The catalyst may be prepared by procedures other than those illustrated above. Also, raw materials used for the preparation of the catalyst are not critical.

The catalyst may be used alone or in combination with any of the known carriers. As carriers, those which bring favorable effects for the reaction involved, such as silica, alumina, alumina-silica, silicate, diatomaceous earth and the like which have been deactivated by, e.g., heat-treatment, may suitably be employed. These carriers may be used for example from 10 to 90% by weight of the catalyst.

The catalyst may be employed in either a fluidized bed or a fixed bed, although it is more advantageously used in a fixed bed since the life of the catalyst is extremely long.

Size and configuration of the catalyst grain are not critical but depend primarily on whether the catalyst is used in a fluidized bed or fixed bed. The catalyst may also be shaped or grained by suitable known methods in order to provide required mechanical strength.

Propylene or isobutylene feed used in the process of the invention is not necessarily highly purified, but a mixture of propylene or isobutylene with saturated hydrocarbons such as propane and butane may also be used. However, any gas substantially inluencing the ammoxidation reaction to any appreciable degree under the particular reaction conditions, for example, acetylene, n-butylene and the like, should preferably be excluded from the feed for the reaction since they may form undesirable by-products.

Likewise, other diluents which do not influence the ammoxidation reactionn, may be present in the reaction mixture without deleterious effect. Such diluents include, for example, steam, nitrogen and carbon dioxide. The amount of diluent in the feed for the reaction is preferably more than 0.5 moles per mole of propylene or isobutylene. Steam in the reaction mixture not only acts as a diluent but also exhibits effects to enhance the selectivity of the catalyst for the formation of acrylonitrile or methacrylonitrile and to make the activity of the catalyst durable. Accordingly, it is generally preferred to add at least 0.5 moles of steam to the feed per mole of propylene or isobutylene.

As a source of oxygen which is used in the ammoxidation reaction of the invention, pure oxygen and any oxygen containing gas may be used. Particularly, air may be advantageously used. A relative proportion of oxygen in the feed for the reaction is suitably from 0.8 to 4 moles, and preferably from about 1.0 to about 2.5 moles per mole of propylene or isobutylene. Feeding of oxygen is excess of the above limit inevitably leads to formation of by-products such as carbon monoxide and carbon dioxide. On the contrary, feeding of oxygen less than the above range brings about a reduction of selectivity of the end product.

A relative proportion of ammonia in the feed for the reaction mixture is suitably from 0.5 to 3 moles, and preferably from about 0.8 to 1.2 moles per mole of propylene or isobutylene.

The ammoxidation reaction is usually carried out under atmospheric pressure although slightly superatmospheric or slightly reduced pressures may be used if desired.

The reaction is suitably carried out at a temperature ranging between 300°C and 550°C, preferably between 350°C and 500°C. Reaction temperatures exceeding the upper limit cause the decomposition of propylene or isobutylene, the reduction of selectivity and the promotion of side-reactions. It is worthy of special mention that the ammoxidation reaction is advantageously performed at approximately 400°C.

A contact time of 0.3 to 20 seconds, especially 0.5 to 15 seconds is preferred. A contact time exceeding the upper limit causes the decomposition of the reaction product and other undesirable side-reactions.

The following examples are given to illustrate the invention and are not to be considered as limiting in any sense. In the examples, "% conversion" and "% selectivity" are defined as follows:

% conversion = (moles of propylene or isobutylene consumed)/(moles of propylene or isobutylene supplied) × 100

% selectivity = (moles of propylene or isobutylene converted to acrylonitrile or methacrylonitrile)/(moles of propylene or isobutylene consumed) × 100 and "%" is % by weight.

EXAMPLES 1 – 6

Bi—Mo—W—Ca catalyst (1)

90.6 g. of ammonium paratungstate [$(NH_4)_{10}W_{12}O_{41}.5H_2O$] and 245.6 g of calcium nitrate [$Ca(NO_3)_2.4H_2O$] were dissolved in 1 l of water maintained at 60°C, while being stirred. To this solution, were added, by drops at the same time, a solution of 168.2 g bismuth nitrate [$Bi(NO_3)_3.5H_2O$] in 202 ml of a 10% nitric acid and a solution of 122.6 g ammonium molybdate [$(NH_4)_6Mo_7O_{24}.4H_2O$] in 267 ml of a 10% aqueous ammonia. Successively, a 10% aqueous ammonia was added to the reaction mixture thereby adjusting the pH to 4.0 to form a precipitate. After leaving overnight, the precipitate was washed by for decantations, filtered and dried. The product was shaped into tablets having a diameter of 5 mm, and then calcined at 600°C for 16 hours to prepare a catalyst.

Using the catalyst so prepared, ammoxidation reaction was performed by the following procedures.

In Example 1, 20 ml of the catalyst, so prepared, was packed into a U-shaped glass reaction tube having an inner diameter of 10 mm. A gaseous mixture of propylene, ammonia, air and steam, the molar ratio of the four components being 27 : 27 : 300 : 106, respectively, was passed through the catalyst-packed reaction tube maintained at 420°C at a flow rate of 460 ml/min. The contact time was 2.6 seconds.

In Example 2, the procedure of Example 1 was followed wherein the amount of the catalyst packed into the reaction tube was 30 ml, the reaction temperature was 400°C and the contact time was 3.9 seconds, with all other conditions remaining substantially the same.

In Example 3, the procedure of Example 1 was followed wherein isobutylene was used in substitution for propylene with all other conditions remaining substantially the same.

In Examples 4, 5 and 6, the procedure of Example 1 was followed wherein catalysts containing the four metal ingredients in varied atomic ratios were employed with all other conditions remaining substantially the same.

The results are shown in Table I.

Table I

| Example No. | Feedstock | Product | Catalyst | Atomic ratio | Conversion (%) | Selectivity (%) |
|---|---|---|---|---|---|---|
| 1 | Propylene | AN *1 | Bi-Mo-W-Ca | 1:2:1:3 | 96.0 | 89.1 |
| 2 | do. | do. | do. | do. | 94.6 | 88.9 |
| 3 | Isobutylene | MAN *2 | do. | do. | 97.3 | 83.2 |
| 4 | Propylene | AN | do. | 1:2:1:6 | 96.3 | 86.6 |
| 5 | do. | do. | do. | 2:1:2:4 | 89.3 | 88.2 |
| 6 | do. | do. | do. | 1:2:1:1 | 91.2 | 85.3 |

Note:
*1 AN: Acrylonitrile
*2 MAN: Methacrylonitrile

EXAMPLE 7

Bi—Mo—W—Ca catalyst (2)

90.6 g of ammonium parantungstate [(NH$_4$)$_{10}$W$_{12}$O$_{41}$.5H$_2$O] and 122.8 g of calcium nitrate [Ca(NO$_3$)$_2$.4H$_2$O] were dissolved in 1 l of hot water. To the solution, were added 168.2 g of bismuth nitrate [Bi(NO$_3$)$_3$.5H$_2$O] and 112.6 g of ammonium molybdate [(NH$_4$)$_6$Mo$_7$O$_{24}$.4H$_2$O] at the same time while the solution was vigorously stirred. The slurry so obtained was heated to dryness in a sand batn until generation of NO$_2$ gas ceased. To the product was added 1.5% of graphite. Then, the mixture was shaped into tablets having a diameter of 5 mm. The tablets were calcined at 600°C for 10 hours to prepare a catalyst.

Using the catalyst, ammoxidation reaction of propylene was performed by the same procedure as that of Example 1. The results are shown in Table II.

EXAMPLE 8

Bi—Mo—W—Ba catalyst 90.6 g of ammonium paratungstate [(NH$_4$)$_{10}$W$_{12}$O$_{41}$.5H$_2$O] and 146 g of barium nitrate [Ba(NO$_3$)$_2$] were dissolved in 1 l of water maintained at 60°C, while being stirred. To this solution, were added by drops at the same time, a solution of 168.2 g bismuth nitrate [Bi(NO$_3$)$_3$.5H$_2$O] in 202 ml of a 10% nitric acid and a solution of 112.6 g ammonium molybdate [(NH$_4$)$_6$Mo$_7$O$_{24}$.4H$_2$O] in 267 ml of 10% aqueous ammonia. Successively, 10% aqueous ammonia was added to the reaction mixture thereby adjusting the pH to 4.0 to form a precipitate. After leaving overnight, the precipitate was washed by four decantations, filtered and dried. The dried product was shaped into tablets and then calcined at 600°C for 16 hours to prepare a catalyst.

Using the catalyst so prepared, ammoxidation reaction of propylene was performed by the same procedure as that of Example 1. The results are shown in Table II.

EXAMPLE 9

Bi—Mo—W—Zn catalyst

The procedure for the preparation of catalyst in Example 8 was repeated wherein 153.5 g of zinc nitrate ]Zn(NO$_3$)$_2$.6H$_2$O] were used in substitution for the 146 g of barium nitrate with all other conditions remaining substantially the same, whereby a catalyst consisting of molybdenum, bismuth, tungsten, zinc and oxygen was prepared.

Using the catalyst so prepared, ammoxidation reaction of propylene was performed by the same procedure as that of Example 1. The results are shown in Table II.

Comparative Example 1

Bi—Mo—Ca catalyst 245.6 g of calcium nitrate [Ca(NO$_3$)$_2$.4H$_2$O] was dissolved in 1 l of water maintained at 60°C. To this solution, were added by drops at the same time a solution of 168.2 g bismuth nitrate [Bi(NO$_3$)$_3$.5H$_2$O] in 202 ml of a 10% nitric acid and a solution of 122.6 g ammonium molybdate [(NH$_4$)$_6$Mo$_7$O$_{24}$.4H$_2$O] in 267 ml of a 10% aqueous ammonia. Then, an aqueous ammonia was added to the reaction mixture thereby adjusting the pH to 4.0 to form a precipitate. The precipitate so formed was treated in the same manner as that of Example 1 to prepare a catalyst.

Using the catalyst so prepared, ammoxidation reaction of propylene was performed by the same procedure as that of Example 1. The results are shown in Table II.

Comparative Example 2

Bi—Mo—W catalyst

Bismuth oxide [$Bi_2O_3$], molybdenum oxide [$MoO_3$] and tungsten oxide [$WO_3$] were mixed at a molar ratio of $Bi_2O_3$: $MoO_3$: $WO_3$ =2 : 1 : 2. The mixture was kneaded together with a small amount of water, and then dried at 120° to 130°C. The dried product was calcined at 540°C for 16 hours to prepare a catalyst.

Using the catalyst so prepared, ammoxidation reaction of propylene was performed by the same procedure as that of Example 1.

|  | Example 11 | Example 12 |
|---|---|---|
| Amount of catalyst | 30 ml | 10 ml |
| Reaction temperature | 400°C | 450°C |
| Contact time | 3.9 sec | 1.3 sec |

In Example 13, ammoxidation reaction of isobutylene was performed by the same procedure as that of Example 10 except that isobutylene was employed in substitution for propylene.

In Examples 14, 15 and 16, the procedure of Example 10 was followed wherein catalysts containing the five metal ingredients in varied atomic ratios were employed, with all other conditions remaining the same. The results of Examples 10 - 16 are shown in Table III.

Table II

| Example No. | Feedstock | Product | Catalyst | Atomic ratio | Conversion (%) | Selectivity (%) |
|---|---|---|---|---|---|---|
| 7 | Propylene | AN | Bi-Mo-W-Ca | 1:2:1:1.5 | 93.5 | 87.1 |
| 8 | do. | do. | Bi-Mo-W-Ba | do. | 97.2 | 85.3 |
| 9 | do. | do. | Bi-Mo-W-Zn | do. | 97.2 | 85.3 |
| Comparative 1 | do. | do. | Bi-Mo-Ca | 1:2:3 | 70.3 | 73.8 |
| Comparative 2 | do. | do. | Bi-Mo-W | 4:1:2 | 85.6 | 75.6 |

EXAMPLES 10 – 16

Bi—Mo—W—Ca—Nb catalyst (1)

74.1 g of ammonium paratungstate [$(NH_4)_{10}W_{12}O_{41}\cdot 5H_2O$], 9.4 g of niobium pentaoxide [$Nb_2O_5$] and 251.3 g of calcium nitrate [$Ca(NO_3)_2\cdot 4H_2O$] were dissolved in 1 l of water maintained at 60°C, while being stirred. To this solution, were added by drops at the same time a solution of 172.2 g bismuth nitrate [$Bi(NO_3)_3\cdot 5H_2O$] in 207 ml of a 10% nitric acid and a solution of 125.5 g ammonium molybdate [$(NH_4)_6Mo_7O_{24}\cdot 4H_2O$] in 298 ml of a 10% aqueous ammonia. Successively, a 10% aqueous ammonia was added to the reaction mixture thereby adjusting the pH to 4.0 to form a precipitate. The precipitate was treated in the same manner as that of Example 1 to prepare a catalyst.

In Example 10, using the catalyst so prepared, ammoxidation reaction of propylene was performed by the same procedure as that of Example 1.

In Examples 11 and 12, the procedure of Example 10 was followed wherein the process conditions were varied as follows with all other conditions remaining substantially the same.

EXAMPLE 17

Bi—Mo—W—Ca—Nb catalyst (2)

74.1 g of ammonium paratungstate [$(NH_4)_{10}W_{12}O_{41}\cdot 5H_2O$], 9.4 g of niobium pentaoxide [$Nb_2O_5$] and 125.7 g of calcium nitrate [$Ca(NO_3)_2\cdot 4H_2O$] were dissolved in 1 l of hot water. To the solution, were added 172.2 g of bismuth nitrate [$Bi(No_3)_3\cdot 5H_2O$] and 125.5 g of ammonium molybdate ]$(NH_4)_6Mo_7O_{24}\cdot 4H_2O$] at the same time while being vigorously stirred. The slurry so obtained was heated to dryness in a sand bath until generation of $NO_2$ gas ceased. From this dried product, a tabletted catalyst was prepared in the same manner as that of Example 7.

Using the catalyst so prepared, ammoxidation reaction of propylene was performed by the same procedure as that of Example 10. The results are shown in Table III.

Table III

| Example No. | Feedstock | Product | Catalyst | Atomic ratio | Conversion (%) | Selectivity (%) |
|---|---|---|---|---|---|---|
| 10 | Propylene | AN | Bi-Mo-W-Ca-Nb | 1:2:0.8:3:0.2 | 96.5 | 90.0 |
| 11 | do. | do. | do. | do. | 95.0 | 89.8 |
| 12 | do. | do. | do. | do. | 94.0 | 88.5 |
| 13 | Isobutylene | MAN | do. | do. | 98.0 | 84.3 |
| 14 | Propylene | AN | do. | 1:2:0.5:3:0.5 | 96.3 | 89.6 |
| 15 | do. | do. | do. | 1:1.8:0.3:6:0.7 | 95.5 | 87.5 |
| 16 | do. | do. | do. | 1:1.8:0.9:6:0.1 | 96.5 | 88.5 |
| 17 | do. | do. | do. | 1:2:0.8:1.5:0.2 | 94.0 | 90.2 |

EXAMPLES 18 – 24

Bi—Mo—W—Ca—Ti catalyst (1)

75.1 g of ammonium paratungstate [$(NH_4)_{10}W_{12}O_{41} \cdot 5H_2O$], 5.75 g of titanium dioxide [$TiO_2$] and 254.5 g of calcium nitrate [$Ca(NO_3)_2 4H_2O$] were dissolved in 1 l of water maintained at 60°C while being stirred. To this solution, were added by drops at the same time a solution of 174.4 g bismuth nitrate [$Bi(NO_3)_3 \cdot 5H_2O$] in 210 ml of a 10% nitric acid and a solution of ammonium molybdate [$(NH_4)_6Mo_7O_{24} \cdot 4H_2O$] in 301 ml. of a 10% aqueous ammonia. Successively, a 10% aqueous ammmonia was added to the reaction mixture thereby adjusting the pH to 4.0 to form a precipitate. The precipitate was treated in the same manner as that of Example 1 to prepare a catalyst.

In Example 18, using the catalyst so prepared, ammoxidation reaction of propylene was performed by the same procedure as that of Example 1.

In Examples 19 and 20, the procedure of Example 18 was followed wherein the process conditions were varied as follows with all other conditions remaining substantially the same.

|  | Example 19 | Example 20 |
|---|---|---|
| Amount of catalyst | 30 ml | 10 ml |
| Reaction temperature | 400°C | 450°C |
| Contact time | 3.9 sec | 1.3 sec |

In Example 21, ammoxidation reaction of isobutylene was performed by the same procedure as that of Example 18 except that isobutylene was employed in substitution for propylene.

In Examples 22, 23 and 24, the procedure of Example 18 was followed wherein catalysts containing the five metal ingredients in varied atomic ratios were employed, with all other conditions remaining substantially the same. The results of Examples 18 – 24 are shown in Table IV

EXAMPLE 25

Bi—Mo—W—Ca—Ti catalyst (2)

A catalyst was prepared from the following compounds by the same procedure as that of Example 17.

| | |
|---|---|
| Ammonium paratungstate [$(NH_4)_{10}W_{12}O_{41} \cdot 5H_2O$] | 75.1 g |
| Titanium dioxide [$TiO_2$] | 5.75 g |
| Calcium nitrate [$Ca(NO_3)_2 \cdot 4H_2O$] | 127.3 g |
| Bismuth nitrate [$Bi(NO_3)_3 \cdot 5H_2O$] | 174.4 g |
| Ammonium molybdate [$(NH_4)_6Mo_7O_{24} \cdot 4H_2O$] | 127.1 g |

Using the catalyst so prepared, ammoxidation reaction of propylene was performed by the same procedure as that of Example 10 with all other conditions remaining substantially the same. The results are shown in Table IV.

EXAMPLES 26 – 29

Bi—Mo—W—Ca—Ta catalyst 72.6 g of ammonium paratungstate [$(NH_4)_{10}W_{12}O_{41} \cdot 5H_2O$], 15.4 g of tantalum pentaoxide [$Ta_2O_5$] and 246.2 g of calcium nitrate [$Ca(NO_3)_2 \cdot 4H_2O$] were dissolved in 1 l of water maintained at 60°C, while being stirred. To the solution, were added by drops at the same time a solution of 168.7 g bismuth nitrate [$Bi(NO_3)_3 \cdot 5H_2O$] in 203 ml of a 10% nitric acid and a solution of 122.9 g ammonium molybdate [$(NH_4)_6Mo_7O_{24} \cdot 4H_2O$] in 291 ml of a 10% aqueous ammonia. Then, a 10% aqueous ammonia was added to the reaction mixture thereby adjusting the pH to 4.0 to form a precipitate. The precipitate was treated in the same manner as that of Example 1 to prepare a catalyst.

In Examples 26 and 27, using the catalyst so prepared, ammoxidation reactions of propylene and isobutylene, respectively, were performed by the same procedure as that of Example 1.

In Examples 28 and 29, the procedure of Example 26 was followed wherein catalysts containing the five metal ingredients in varied atomic ratios were employed, with all other conditions remaining the same. The results of Examples 26 – 29 are shown in Table IV.

EXAMPLES 30 – 33

Bi—Mo—W—Ca—Zr catalyst 74.3 g of ammonium paratungstate [$(NH_4)_{10}W_{12}O_{41} \cdot 5H_2O$], 19.0 g of zirconium nitrate [$ZrO(NO_3)_2 \cdot 2H_2O$] and 251.9 g of calcium nitrate [$Ca(NO_3)_2 \cdot 4H_2O$] were dissolved in 1 l of water maintained at 60°C, while being stirred. To this solution, were added by drops at the same time a solution of 172.6 g bismuth nitrate [$Bi(NO_3)_3 \cdot 5H_2O$] in 207 ml of a 10% nitric acid and a solution of 125.8 g ammonium molybdate [$(NH_4)_6Mo_7O_{24} \cdot 4H_2O$] in a 10% aqueous ammonia. Successively, a 10% aqueous ammonia was added thereby adjusting the pH to 4.0 to form a precipitate. The precipitate was treated in the same manner as that of Example 1 to prepare a catalyst.

In Examples 30 and 31, using the catalyst so prepared, ammoxidation reactions of propylene and isobutylene, respectively, were performed by the same procedure as that of Example 1.

In Examples 32 and 33, the procedure of Example 30 was followed wherein catalysts containing the five metal ingredients in varied atomic ratios were employed, with all other conditions remaining substantially the same. The results of Examples 30 – 33 are shown in Table IV.

Table IV

| Example No. | Feedstock | Product | Catalyst | Atomic ratio | Conversion (%) | Selectivity (%) |
|---|---|---|---|---|---|---|
| 18 | Propylene | AN | Bi-Mo-W-Ca-Ti | 1:2:0.8:3:0.2 | 96.0 | 89.5 |
| 19 | do. | do. | do. | do. | 94.4 | 89.1 |
| 20 | do. | do. | do. | do. | 93.5 | 88.0 |
| 21 | Isobutylene | MAN | do. | do. | 97.5 | 83.8 |

Table IV – Continued

| Example No. | Feedstock | Product | Catalyst | Atomic ratio | Conversion (%) | Selectivity (%) |
|---|---|---|---|---|---|---|
| 22 | Propylene | AN | do. | 1:2:0.5:3:0.5 | 95.7 | 89.1 |
| 23 | do. | do. | do. | 1:1.8:0.3:6:0.7 | 95.0 | 86.8 |
| 24 | do. | do. | do. | 1:1.8:0.9:6:0.1 | 95.9 | 88.1 |
| 25 | do. | do. | do. | 1:2:0.8:1.5:0.2 | 93.5 | 89.0 |
| 26 | do. | do. | Bi-Mo-W-Ca-Ti | 1:2:0.8:3:0.2 | 95.7 | 88.3 |
| 27 | Isobutylene | MAN | do. | do. | 97.0 | 82.0 |
| 28 | Propylene | AN | do. | 1:2:0.5:3:0.5 | 95.4 | 87.9 |
| 29 | do. | do. | do. | 1:1.8:0.9:6:0.1 | 95.6 | 87.0 |
| 30 | do. | do. | Bi-Mo-W-Ca-Zr | 1:2:0.8:3:0.2 | 95.5 | 87.5 |
| 31 | Isobutylene | MAN | do. | do. | 97.0 | 82.2 |
| 32 | Propylene | AN | do. | 1:2:0.5:3:0.5 | 95.3 | 87.0 |
| 33 | do. | do. | do. | 1:1.8:0.9 6:0.1 | 95.5 | 86.0 |

EXAMPLES 34 – 40

Bi—Mo—W—Ca—Fe catalyst (1)

75.1 g of ammonium paratungstate [$(NH_4)_{10}W_{12}O_{41} \cdot 5H_2O$], 29.0 g of ferric nitrate [$Fe(NO_3)_3 \cdot 9H_2O$] and 254.5 g of calcium nitrate [$Ca(NO_3)_2 \cdot 4H_2O$] were dissolved in 1 l of water maintained at 60°C, while being stirred. To this solution, were added by drops at the same time a solution of 174.4 g bismuth nitrate [$Bi(NO_3)_3 \cdot 5H_2O$] in 210 ml of a 10% nitric acid and a solution of 127.0 g ammonium molybdate in 302 ml of a 10% aqueous ammonia. Then, a 10% aqueous ammonia was added thereby adjusting the pH to 4.0 to form a precipitate. The precipitate was treated in the same manner as that of Example 1 to prepare a catalyst.

In Examples 34 and 37, using the catalyst so prepared, ammoxidation reactions of propylene and isobutylene, respectively, were performed by the same procedure as that of Example 1.

In Examples 35 and 36, the procedure of Example 10 was followed wherein the process conditions were varied as follows, with all other conditions remaining substantially the same.

|  | Example 35 | Example 36 |
|---|---|---|
| Amount of catalyst | 30 ml | 10 ml |
| Reaction temperature | 400°C | 450°C |
| Contact time | 3.9 sec | 1.3 sec |

In Examples 38, 39 and 40, the procedure of Example 34 was followed wherein catalysts containing the five metal ingredients at varied atomic ratios were employed with all other conditions remaining substantially the same.

The results of Examples 34 – 40 are shown in Table V.

EXAMPLE 41

Bi—Mo—W—Ca—Fe catalyst (2)

49.6 g of ammonium paratungstate [$(NH_4)_{10}W_{12}O_{41} \cdot 5H_2O$], 76.8 g of ferric nitrate [$Fe(NO_3)_3 \cdot 9H_2O$] and 269.2 g of calcium nitrate [$Ca(NO_3)_2 \cdot 4H_2O$] were dissolved in 1 l of hot water. To this solution, were added at the same time 184.4 g of bismuth nitrate [$Bi(NO_3)_3 \cdot 5H_2O$] and 134.4 g of ammonium molybdate [$(NH_4)_6Mo_7O_{24} \cdot 4H_2O$] while being vigorously stirred. The slurry so obtained was heated to dryness in a sand bath until generation of $NO_2$ gas ceased. 1.5% of graphite was added to the dried product. Then, the mixture was shaped into tablets having diameter of 5 mm. The tablets were calcined at 600°C for 10 hours to prepare a catalyst.

Using the catalyst so prepared, ammoxidation reaction of propylene was performed by the same procedure as that of Example 34. The results are shown in Table V.

EXAMPLES 42 – 45

Bi—Mo—W—Ca—Co catalyst 49.8 g of ammonium paratungstate [$(NH_4)_{10}W_{12}O_{41} \cdot 5H_2O$], 55.5 g of cobalt nitrate [$Co(NO_3)_2 \cdot 6H_2O$] and 270.1 g of calcium nitrate [$Ca(NO_3)_2 \cdot 4H_2O$] were dissolved in 1 l of water maintained at 60°C. To this solution, were added by drops at the same time a solution of 185.0 g bismuth nitrate [$Bi(NO_3)_3 \cdot 5H_2O$] in 222 ml of a 10% nitric acid and a solution of 134.8 g ammonium molybdate [$(NH_4)_6Mo_7O_{24} \cdot 4H_2O$] in 320 ml of a 10% aqueous ammonia. Successively, a 10% aqueous ammonia was added thereby adjusting the pH to 4.0 to form a precipitate. The precipitate was treated in the same manner as that of Example 1 to prepare a catalyst.

In Example 42, using the catalyst so prepared, ammoxidation reaction of propylene was performed by the same procedure as that of Example 1.

In Examples 43, 44 and 45, the procedure of Example 42 was followed wherein catalysts containing the five metal ingredients at varied atomic ratios were employed with all other conditions remaining substantially the same.

The results of Examples 42 – 45 are shown in Table V.

EXAMPLES 46 – 49

Bi—Mo—W—Ca—Ni catalyst 49.8 g of ammonium paratungstate [$(NH_4)_{10}W_{12}O_{41} \cdot 5H_2O$], 270.1 g of calcium nitrate

[Ca(NO$_3$)$_2$.4H$_2$O] and 55.5 g of nickel nitrate [Ni(NO$_3$)$_2$.6H$_2$O] were dissolved into 1 l of water maintained at 60°C, while being stirred. To this solution, there were dropped at the same time a solution of 185.1 g bismuth nitrate [Bi(NO$_3$)$_3$.5H$_2$O] in 222 ml of a 10% nitric acid and a solution of 134.9 g ammonium molybdate [(NH$_4$)$_6$Mo$_7$O$_{24}$.4H$_2$O] in 320 ml of a 10% aqueous ammonia. Successively, a 10% aqueous ammonia was added thereby adjusting the pH to 4.0 to form a precipitate. The precipitate was treated in the same manner as that of Example 1 to prepare a catalyst.

In Example 46, using the catalyst so prepared, ammoxidation reaction of propylene was performed by the same procedure as that of Example 1.

In Examples 47 – 49, the procedure of Example 46 was followed wherein catalysts containing the five metal ingredients at varied atomic ratios were employed with all other conditions remaining substantially the same.

The results of Examples 46 – 49 are shown in Table V.

EXAMPLES 50 – 53

Bi—Mo—W—Ca—Cr catalyst 49.8 g of ammonium paratungstate [(NH$_4$)$_{10}$W$_{12}$O$_{41}$.5H$_2$O], 76.3 g of chromium nitrate [Cr(NO$_3$)$_3$.9H$_2$O] and 269.9 g of calcium nitrate [Ca(NO$_3$)$_2$.4H$_2$O] were dissolved in 1 l of water maintained at 60°C, while being stirred. To this solution, were added by drops at the same time a solution of 184.9 g bismuth nitrate [Bi(NO$_3$)$_3$.5H$_2$O] in 222 ml of a 10% nitric acid and a solution of 134.7 g ammonium molybdate [(NH$_4$)$_6$Mo$_7$O$_{24}$.4H$_2$O] in 319 ml of a 10% aqueous ammonia. Successively, a 10% aqueous ammonia was added thereby adjusting the pH to 4.0 to form a precipitate. The precipitate was treated in the same manner as that of Example 1 to prepare a catalyst.

In Example 50, using the catalyst so prepared, ammoxidation reaction of propylene was performed by the same procedure as that of Example 1.

In Examples 51, 52 and 53, the procedure of Example 50 was followed wherein catalysts containing the five metal ingredients at varied atomic ratios were employed with all other conditions remaining substantially the same.

The results of Examples 50 – 53 are shown in Table V.

EXAMPLES 54 – 57

Bi—Mo—W—Ca—Mn catalyst
49.9 g of ammonium paratungstate [(NH$_4$)$_{10}$W$_{12}$O$_{41}$.5H$_2$O], 90.0 g of manganese nitrate [Mn(NO$_3$)$_2$.6H$_2$O] and 270.8 g of calcium nitrate [Ca(NO$_3$)$_2$.4H$_2$O] were dissolved in 1 l of water maintained at 60°C, while being stirred. To this solution, were added by drops at the same time a solution of 185.5 g bismuth nitrate [Bi(NO$_3$)$_3$.5H$_2$O] in 223 ml of a 10% nitric acid and a solution of 135.2 g ammonium molybdate [(NH$_4$)$_6$Mo$_7$O$_{24}$.4H$_2$O] in 321 ml of a 10% aqueous ammonia. Successively, a 10% aqueous ammonia was added thereby adjusting the pH to 4.0 to form a precipitate. The precipitate was treated in the same manner as that of Example 1 to prepare a catalyst.

In Example 54, using the catalyst so prepared, ammoxidation reaction of propylene was performed by the same procedure as that of Example 1.

In Examples 55, 56 and 57, the procedure of Example 54 was followed wherein catalysts containing the five metal ingredients at varied atomic ratios were employed with all other conditions remaining substantially the same.

The results of Examples 54 – 57 are shown in Table V.

Table V

| Example No. | Feedstock | Product | Catalyst | Atomic ratio | Conversion (%) | Selectivity (%) |
|---|---|---|---|---|---|---|
| 34 | Propylene | AN | Bi-Mo-W-Ca-Fe | 1:2:0.8:3:0.2 | 98.7 | 89.0 |
| 35 | do. | do. | do. | do. | 96.6 | 88.6 |
| 36 | do. | do. | do. | do. | 95.2 | 87.6 |
| 37 | Isobutylene | MAN | do. | do. | 99.0 | 81.6 |
| 38 | Propylene | AN | do. | 1:1.5:0.5:3:0.2 | 97.4 | 87.0 |
| 39 | do. | do. | do. | 1:1.8:0.3:6:0.5 | 98.8 | 86.3 |
| 40 | do. | do. | do. | 1:1:1:6:0.3 | 94.2 | 88.1 |
| 41 | do. | do. | do. | 1:2:0.5:3:0.5 | 96.9 | 85.6 |
| 42 | do. | do. | Bi-Mo-W-Ca-Co | 1:2:0.5:3:0.5 | 98.6 | 85.0 |
| 43 | do. | do. | do. | 1:1.5:0.5:3:0.3 | 97.8 | 88.0 |
| 44 | do. | do. | do. | 1:2:1:3:0.2 | 97.6 | 88.5 |
| 45 | do. | do. | do. | 1:2:1:6:0.5 | 99.0 | 86.2 |
| 46 | do. | do. | Bi-Mo-W-Ca-Ni | 1:2:0.5:3:0.5 | 96.7 | 87.6 |
| 47 | do. | do. | do. | 1:1.5:0.2:6:0.2 | 90.1 | 87.7 |
| 48 | Propylene | AN | Bi-Mo-W-Ca-Ni | 1:1.8:1:4:1 | 91.7 | 87.6 |
| 49 | do. | do. | do. | 1:2.0:0.8:3:0.8 | 97.9 | 85.5 |
| 50 | do. | do. | Bi-Mo-W-Ca-Cr | 1:2:0.5:3:0.5 | 96.5 | 86.2 |

Table V — Continued

| Example No. | Feedstock | Product | Catalyst | Atomic ratio | Conversion (%) | Selectivity (%) |
|---|---|---|---|---|---|---|
| 51 | do. | do. | do. | 1:1:0.5:2:0.8 | 96.7 | 86.7 |
| 52 | do. | do. | do. | 1:2:0.2:3:1.0 | 90.9 | 88.2 |
| 53 | do. | do. | do. | 1:3:1.0:6:0.2 | 92.3 | 84.9 |
| 54 | do. | do. | Bi-Mo-W-Ca-Mn | 1:2:0.5:3:0.8 | 94.3 | 89.2 |
| 55 | do. | do. | do. | 1:0.5:1.0:3:0.5 | 92.2 | 87.4 |
| 56 | do. | do. | do. | 1:1:0.5:3:0.2 | 94.4 | 88.6 |
| 57 | do. | do. | do. | 1:3:0.8:3:0.8 | 93.1 | 87.8 |

EXAMPLES 58 – 61
Bi—Mo—W—Ca catalyst (3)

236 g of calcium nitrate [$Ca(NO_3)_2 \cdot 4H_2O$] were dissolved in 1 l of water. To the solution, were added by drops 214 ml of a solution of 378 g ammonium molybdate $(NH_4)Mo_7O_{24} \cdot 4H_2O$ in a 9.3% aqueous ammonia (the concentration of ammonium molybdate: 0.307 mol/l). Immediately thereafter, a 13.8% nitric acid was quickly added to the mixed solution thereby adjusting the pH to 5 – 5.5, followed by the agitation. After leaving at a room temperature overnight, a coprecipitate settled was removed. The coprecipitate was sufficiently washed and then dried at a temperature of 120° to 130°C for 16 hours. Successively, the dried coprecipitate was calcined at 540°C for 16 hours, while blowing air. Thus, calcium molybdate [$CaMoO_4$] was prepared. The calcium molybdate was identified by the results of the X-ray diffraction diagram.

240 ml of a solution of 83.3 g tungstic acid [$WO_3 \cdot H_2O$] dissolved in a 9.3% aqueous ammonia (thus, the solution is an ammonium tungstate solution having a concentration of 0.66 mol/l), and 320 ml of a 485.1 g bismuth nitrate [$Bi(NO_3)_3 \cdot 5H_2O$] solution in a 13.8% nitric acid (the concentration of bismuth nitrate: 1.0 mol/l were mixed with each other while being stirred. The mixed solution was heated to dryness until generation of ammonium nitrate and nitrogen oxide ceased. A small amount of water was added to the dried solid, followed by kneading for 2 hours. After drying at 120° to 130°C for 16 hours, the dried solid was calcined at 540°C for 16 hours while blowing air. Thus, bismuth tungstate [$Bi_2O_3 \cdot WO_3$] was prepared. The bismuth tungstate was identified by the results of the X-ray diffraction diagram.

The calcium molybdate and the bismuth tungstate, so prepared, were mixed and kneaded together with a small amount of water for 3 hours. The paste was dried at a temperature of 120° to 130°C for 16 hours, and then calcined at 540°C for 16 hours while blowing air. The calcined solid was dressed to grain of 14 to 20 mesh (Tyler standard sieve), which was employed as a catalyst.

4 ml of the catalyst was packed into a U-shaped stainless steel reaction tube having an inner diameter of 8 mm. A gaseous mixture of olefin (propylene in Examples 58 and 60 and (isobutylene in Examples 59 and 61), ammonia, steam and air, a molar ratio of the four components being 1 : 1 : 2 : 7.5, respectively, was passed through the catalyst packed reaction tube maintained at 420°C at a flow rate of 80.5 ml/min. The contact time was 3 seconds. The results are shown in Table VI.

Table VI

| Example No. | Feedstock | Product | Catalyst | Atomic ratio | Conversion (%) | Selectivity % |
|---|---|---|---|---|---|---|
| 58 | Propylene | AN | Bi-Mo-W-Ca | 2:3:1:3 | 92.7 | 87.1 |
| 59 | Isobutylene | MAN | do. | do. | 93.1 | 86.3 |
| 60 | Propylene | AN | do. | 2:1:1:1 | 92.9 | 88.1 |
| 61 | Isobutylene | MAN | do. | do. | 93.9 | 85.8 |

EXAMPLES 62 – 69
Bi—Mo—W—Ca—Nb, Ti, V, Fe, Zr or Ta catalyst

By procedures similar to that of preparing bismuth tungstate in Example 58, bismuth niobate [$BiNbO_4$], bismuth titanate [$Bi_2Ti_2O_7$], bismuth vanadate [$BiVO_4$], bismuth ferrate [$BiFeO_3$], bismuth zirconate [$Bi_2(ZrO_3)_3$] and bismuth tantalate [$BiTaO_4$] were prepared wherein a solution of bismuth nitrate in nitric acid; and niobium pentaoxide [$Nb_2O_5$], titanium dioxide [$TiO_2$], a solution of ammonium metavanadate [$NH_4VO_3$] in oxalic acid, an aqueous solution of ferric nitrate [$Fe(NO_3)_3 \cdot 9H_2O$], an aqueous solution of zirconium nitrate [$ZrO(NO_3)_2 \cdot 2H_2O$] and tantalum pentaoxide [$Ta_2O_5$] were used, respectively. These six compounds were identified by the results of the X-ray diffraction diagrams.

From each of these six compounds and the calcium molybdate mentioned in Example 58 and the bismuth tungstate mentioned in Example 58, a catalyst was prepared in the same manner as that of Example 58.

Using the catalyst so prepared, ammoxidation reactions of propylene and isobutylene were performed by the same procedure as that of Example 58. The results are shown in Table VII.

EXAMPLES 70 and 71
Bi—Mo—W—Ca—Ti—Nb or Zr catalyst

From the calcium molybdate in Example 58, the bismuth tungstate in Example 58, the bismuth titanate in Example 65, the bismuth niobate in Example 62 and the bismuth zirconate in Example 68, two catalysts were prepared in the same manner as that of Example 58.

Using the catalysts, ammoxidation reaction of propylene was performed by the same procedure as that of Example 58. The results are shown in Table VII.

Table VII

| Example No. | Feedstock | Product | Catalyst | Atomic ratio | Conversion (%) | Selectivity (%) |
|---|---|---|---|---|---|---|
| 62 | Propylene | AN | Bi-Mo-W-Ca-Nb | 3:2:1:2:1 | 93.2 | 88.8 |
| 63 | Isobutylene | MAN | do. | do. | 93.4 | 87.3 |
| 64 | Propylene | AN | do. | 3:1:1:1:1 | 93.0 | 89.3 |
| 65 | do. | do. | Bi-Mo-W-Ca-Ti | 4:1:1:1:2 | 92.9 | 89.4 |
| 66 | do. | do. | Bi-Mo-W-Ca-V | 3:1:1:1:1 | 93.1 | 86.9 |
| 67 | do. | do. | Bi-Mo-W-Ca-Fe | 3:1:1:1:1 | 93.1 | 90.7 |
| 68 | do. | do. | Bi-Mo-W-Ca-Zr | 4:1:1:1:3 | 93.3 | 90.4 |
| 69 | do. | do. | Bi-Mo-W-Ca-Ta | 3:1:1:1:1 | 92.9 | 87.1 |
| 70 | do. | do. | Bi-Mo-W-Ca-Ti-Nb | 5:1:1:1:2:1 | 94.0 | 87.3 |
| 71 | do. | do. | Bi-Mo-W-Ca-Ti-Zr | 7:1:1:1:2:3 | 94.1 | 86.6 |

EXAMPLES 72 – 77

Bi—Mo—W—Ca—Cr—Ti catalyst 32.4 g of ammonium paratungstate [$(NH_4)_{10}W_{12}O_{41}\cdot 5H_2O$], 49.7 g of chromium nitrate [$Cr(NO_3)_3\cdot 9H_2O$], 9.9 g of titanium dioxide [$TiO_2$] and 220.0 g of calcium nitrate [$Ca(NO_3)_2\cdot 4H_2O$] were dissolved in 1 l of water maintained at 60°C, while being stirred. To this solution, were added by drops at the same time a solution of 150.6 g bismuth nitrate [$Bi(NO_3)_3\cdot 5H_2O$] in 181 ml of a 10% nitric acid and a solution of 109.7 g ammonium molybdate [$(NH_4)_6Mo_7O_{24}\cdot 4H_2O$] in 260 ml of a 10% aqueous ammonia. Immediately thereafter, a 10% aqueous ammonia was added to the mixed solution thereby adjusting the pH to 4.0 to form a precipitate. After leaving overnight the precipitate was washed by repeating decantation, filtered and then dried. The dried solution was shaped into tablets having 5 mm diameter and approximately 5 mm height. The tablets were calcined at 650°C for 10 hours (a rate of temperature increase was 20°C/hour) to prepare a catalyst.

20 ml of the catalyst was packed into a U-shaped glass reaction tube having an inner diameter of 10 mm. A gaseous mixture of olefin (propylene in Example 72 and isobutylene in Example 73), ammonia, air and steam, a molar ratio of the four components being 27 : 27 : 300 : 106 respectively, was passed through the catalyst-packed reaction tube maintained at 420°C at a flow rate of 460 ml/min. The contact time was 2.6 seconds.

In Examples 74, 75, 76 and 77, ammoxidation reaction of propylene was performed by the same procedure as that described above except that catalysts containing the six metal ingredients at varied atomic ratios were employed. The results are shown in Table VIII.

Table VIII

| Example No. | Feedstock | Product | Catalyst | Atomic ratio | Conversion (%) | Selectivity (%) |
|---|---|---|---|---|---|---|
| 72 | Propylene | AN | Bi-Mo-W-Ca-Cr-Ti | 1:2:0:0.4:3:0.4:0.4 | 95.3 | 87.1 |
| 73 | Isobutylene | MAN | do. | do. | 95.7 | 87.1 |
| 74 | Propylene | AN | do. | 1:2:0.2:3:0.4:0.4 | 92.8 | 85.3 |
| 75 | do. | do. | do. | 1:2:0.4:3:0.8:0.4 | 91.5 | 86.8 |
| 76 | do. | do. | do. | 1:1.5:0.8:3:0.2:0.4 | 95.2 | 84.4 |
| 77 | do. | do. | do. | 1:2:0.2:3:0.8:0.8 | 93.4 | 87.0 |

In order to evaluate the dimensional stability and the mechanical properties of the catalysts employed, crushing strength and diameter of the tabletted catalysts were determined. The determination was made on specimen catalysts before and after it was used in the conversion of olefin to nitrile under the following procedure. That is, 10 ml of a specimen catalyst having 5 mm diameter and approximately 5 mm height was packed into a U-shaped glass reaction tube. A gaseous mixture of propylene, ammonia, air and steam, a molar ratio of the four components being 10 : 10 : 100 : 10, was passed through the catalyst packed reaction tube maintained at 500°C at a flow rate of 130 ml/min over a period of 200 hours. The measurement of both crushing strength and the diameter was made on the approximately 50 tabletted specimen catalysts, and average values were calculated. In the determination of crushing strength, a KIYA type hardness tester was employed.

Test results are shown in Table IX.

Table IX

| Example No. | Crushing strength (kg) | | Diameter (mm) | |
|---|---|---|---|---|
| | Before use | After use | Before use | After use |
| 72 | 15.3 | 15.5 | 4.77 | 4.77 |
| 74 | 13.7 | 13.9 | 4.97 | 4.78 |
| 75 | 13.6 | 13.3 | 4.78 | 4.78 |
| 76 | 15.8 | 15.6 | 4.75 | 4.74 |
| 77 | 16.5 | 16.7 | 4.80 | 4.81 |

EXAMPLES 78 and 79

Bi—Mo—W—Ca—Cr—Zr catalyst 75.1 g of ammonium paratungstate [$(NH_4)_{10}W_{12}O_{41}\cdot 5H_2O$], 28.8 g of chromium nitrate [$Cr(NO_3)_3\cdot 9H_2O$], 19.0 g of zirconium nitrate [$ZrO(NO_3)_2\cdot 2H_2O$] and 254.8 g of calcium nitrate [$Ca(NO_3)_2\cdot 4H_2O$] were dissolved in 1 l of water maintained at 60°C while being stirred. To this solution, were added by drops at the same time a solution of 174.5 g bismuth nitrate [$Bi(NO_3)_3\cdot 5H_2O$] in 210 ml of a 10% nitric acid and a solution of 127.2 g ammonium molybdate [$(NH_4)_6Mo_7O_{24}\cdot 4H_2O$] in 302 ml of a 10% aqeuous ammonia. Immediately thereafter, a 10% aqueous ammonia was added to the mixed solution thereby adjusting the pH to 4.0 to form a precipitate. The precipitate was treated in the same manner as that of Example 72 to prepare a tabletted catalyst.

Using the catalyst so prepared, ammoxidation reaction of propylene was performed by the procedure of Example 72.

In Example 79, the above procedure was followed wherein a catalyst containing the six metal ingredients at a varied atomic ratio was employed with all other conditions remaining the same. The results are shown in Tables X and XI.

EXAMPLES 80 - 83

48.0 g of ammonium paratungstate [$(NH_4)_{10}W_{12}O_{41}\cdot 5H_2O$], 28.8 g of chromium nitrate [$Cr(NO_3)_3\cdot 9H_2O$], 9.4 g of niobium pentaoxide [$Nb_2O_5$] and 251.3 g of calcium nitrate [$Ca(NO_3)_2\cdot 4H_2O$] were dissolved in 1 l of water maintained at 60°C while being stirred. To this solution, were added by drops at the same time a solution of 172.2 g bismuth nitrate [$Bi(NO_3)_3\cdot 5H_2O$] in 207 ml of a 10% nitric acid and a solution of 125.5 g ammonium molybdate [$(NH_4)_6Mo_7O_{24}\cdot 4H_2O$] in 298 ml of a 10% aqueous ammonia. Immediately thereafter, a 10% aqueous ammonia was added the mixed solution thereby adjusting the pH to 4.0 to form a precipitate. The precipitate was treated in the same manner as that of Example 72 to prepare a tabletted catalyst.

Using the catalyst so prepared, ammoxidation reaction of propylene was performed by the procedure of Example 72.

In Examples 81, 82 and 83, the above procedure was followed wherein catalysts containing the six metal ingredients at varied atomic ratios were employed with all other conditions remaining substantially the same. The results are shown in Tables X and XI.

Table X

| Example No. | Feedstock | Product | Catalyst | Atomic ratio | Conversion (%) | Selectivity (%) |
|---|---|---|---|---|---|---|
| 78 | Propylene | AN | Bi-Mo-W-Ca-Cr-Zr | 1:2:0.8:3:0:2:0.2 | | |
| 79 | do. | do. | do. | 1:2:0.5:3:0.5:0.5 | 97.2 | 86.1 |
| 80 | do. | do. | Bi-Mo-W-Ca-Cr-Nb | 1:2:0.5:3:0.2:0.2 | 95.7 | 85.7 |
| 81 | do. | do. | do. | 1:2:0.8:3:0.2:0.6 | 93.2 | 86.3 |
| 82 | do. | do. | do. | 1:1.5:0.2:2:0.8:0.4 | 92.8 | 87.2 |
| 83 | do. | do. | do. | 1:1:0.4:6:0.4:0.4 | 96.2 | 83.8 |

Table XI

| Example No | Crushing strength (kg) | | Diameter (mm) | |
|---|---|---|---|---|
| | Before use | After use | Before use | After use |
| 78 | 17.0 | 16.3 | 4.80 | 4.79 |
| 79 | 16.3 | 15.4 | 4.79 | 4.78 |
| 80 | 15.9 | 15.1 | 4.80 | 4.80 |
| 81 | 13.2 | 13.6 | 4.76 | 4.75 |
| 82 | 10.9 | 16.1 | 4.77 | 4.77 |
| 83 | 14.3 | 14.0 | 4.76 | 4.76 |

What we claim is:

1. A process for the manufacture of acrylonitrile or methacrylonitrile from propylene or isobutylene, respectively, comprising contacting in the vapor phase at an elevated temperature a mixture of propylene or isobutylene, ammonia and oxygen with a catalyst consisting of an oxide composition containing the elements according to the formula $$BiMo_aW_bII_cX_dO_e$$

wherein II is at least one metal selected from the group consisting of calcium, barium and zinc; X is a single metal selected from the group consisting of titanium, zirconium, niobium, tantalum, vanadium, chromium, manganese, iron, cobalt and nickel or a two metal combination selected from the group consisting of titanium and niobium, titanium and zirconium, chromium and titanium, chromium and zirconium and chromium and niobium; and each of the subscripts $a$, $b$, $c$ and $d$ denote the atomic ratio of the respective metal to bismuth and falling within the following ranges, $a = 0.3$ to $10$, $b = 0.05$ to $3.0$, $c = 0.1$ to $6.0$ and $d = 0$ to $5.0$, and e is a value corresponding to the oxides formed from the above components by combination and is a number which satisfies the average valency of the metals employed, and falls within the range of 3.2 and 61.5, said catalyst being a mixture of the metal oxides or in bonded state and being produced by intimately mixing at least one compound selected from the group consisting of the salts, the oxides, and mixtures thereof of each of respective elements in an aqueous system, heating to dryness, and then subsequently calcining at a considerably higher temperature.

2. A process as claimed in claim 1 wherein said mixture has a molar ratio of ammonia to propylene or isobutylene in the range of 0.5 : 1 to 3 : 1 and a molar ratio of oxygen to propylene or isobutylene in the range of 0.8 : 1 to 4 : 1.

3. A process as claimed in claim 1, wherein said mixture further contains at least 0.5 mole of steam per mole of propylene or isobutylene.

4. A process as claimed in claim 1 wherein said mixture is contacted with said catalyst at a temperature of 300° to 550°C.

5. A process as claimed in claim 1, wherein said mixture is contacted with said catalyst for a period of 0.3 to 20 seconds.

* * * * *